July 19, 1949.
C. N. SPENCER
2,476,831
CURING BAG
Filed Dec. 13, 1946
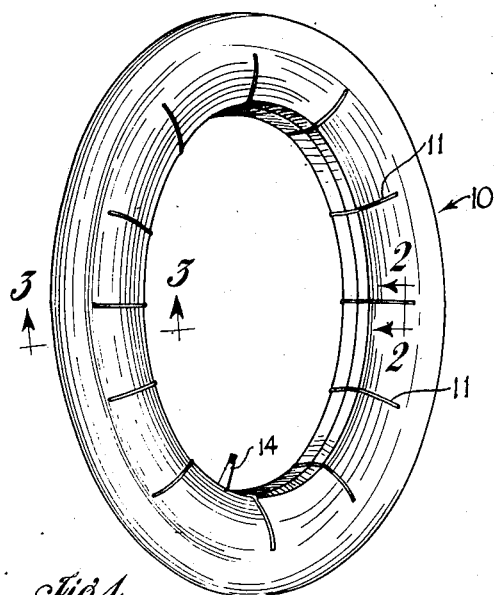
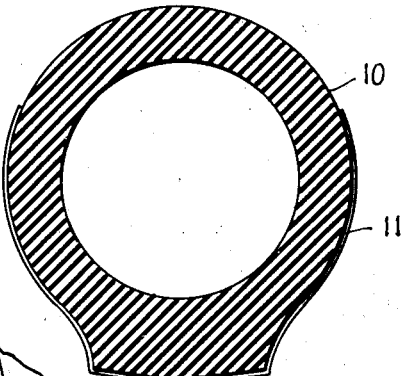
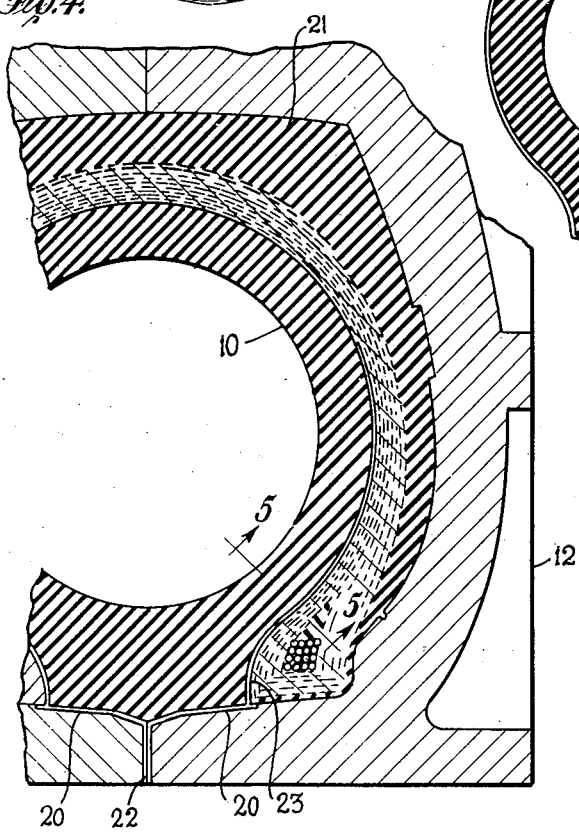
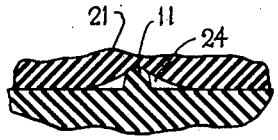
INVENTOR
CORWIN N. SPENCER
BY
ATTORNEYS Patented July 19, 1949

2,476,831

UNITED STATES PATENT OFFICE 2,476,831

CURING BAG

Corwin N. Spencer, Akron, Ohio, assignor to The Firestone Tire & Rubber Company, Akron, Ohio, a corporation of Ohio Application December 13, 1946, Serial No. 716,017

3 Claims. (Cl. 18—45)

This invention relates to a curing bag and more especially to an inflatable full circle curing bag composed of rubber, or rubber-like material, of the type commonly used in providing internal pressure for pneumatic vehicle tires during their vulcanization.

A principal object of the invention is to provide a curing bag of the character described provided with means for the prevention of trapping air between the curing bag and a tire.

Another object of the present invention is to provide means upon the external surface of a curing bag adapted to vent air to the atmosphere from between the curing bag and a tire in which said bag is used in a tire vulcanizing operation.

A further object of the present invention is to provide air venting means upon the outer surface of a curing bag of a type that will not injure a tire in which the bag is used.

With these and other objects in view, which will appear as the description proceeds, the invention resides in the feature of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Fig. 1 is a perspective view of a curing bag embodying the present invention;

Fig. 2 is a fragmentary sectional view taken on line 2—2 of Fig. 1 but drawn on an enlarged scale;

Fig. 3 is a sectional view taken on line 3—3 of Fig. 1;

Fig. 4 is a partial sectional view on an enlarged scale illustrating the relative position of a curing bag, a tire and a tire curing mold during a tire vulcanization; and Fig. 5 is a fragmentary sectional view taken on line 5—5 of Fig. 4 illustrating the relative position of the vents of the curing bag and the inside wall of a tire just before the curing bag has molded the inside of the tire into its final molded shape.

A common and troublesome manufacturing defect of large pneumatic cord tires such as, for example, size 1100–24, is a large sidewall or tread blister in the form of a separation, which defect becomes discernible at the time, or shortly after, a tire is removed from its curing mold. Prior to the present invention many expedients were tried to prevent these costly defects, but without avail. For example, tire builders were required to practice great care to avoid trapping air between the rubber of the tread and sidewall and the fabric body of the tire. Also special cements were used to obtain improved unions between the sidewalls, treads and the fabric tire bodies. Another expedient practiced was to punch small holes through the rubber sidewall and treads to let the gases escape, whereby avoidance of a blister, or separation was sought. Improved compounds, and numerous other ways and means, were tried but none was effective in avoiding the said blistering, or separation.

Applicant discovered that the blisters resulted from air trapped not between the fabric body and its rubber covering, but between the curing bag and unvulcanized tire. Further that this trapped air worked its way through the fabric body of the tire, under the urge of the internal curing pressure of the bag, until the air reached the sidewall, or tread of the tire. Since the sidewall and tread of the tire are composed of rubber, which is substantially impervious to air, the said air becomes trapped under pressure against the said sidewall or tread. Applicant discovered that when a tire with air so trapped, was removed from a hot mold that the trapped air, under pressure, blew the rubber away from the body of the tire forming large sidewall, or tread blisters according to the location of the said blisters. Applicant conceived the idea of preventing such air traps, and thereby the blisters, by utilizing a combination of small ribs on the base and sides of the curing bag, and in combination therewith a series of narrow grooves cut in the base of the tire mold cavity. Said grooves extend from the bead seat portion of said mold cavity to the inside parting line of the tire mold, said grooves continuing radially inwardly along the sides of said parting line to the open inside center of the mold.

Referring to the drawing in detail, particularly to Figs. 1 and 2, it will be seen that circumferentially spaced ribs 11 extend around the base of a curing bag 10 and radially up the sides thereof to a position just beyond the widest point of the bag. While the shape and size of ribs 11 may be changed, a rib $\frac{1}{16}$ inch wide, $\frac{1}{16}$ inch high with a rounded top has been found to be satisfactory for 1100–24 pneumatic tires when the ribs are spaced circumferentially of the bag approximately one foot apart.

Referring now particularly to Fig. 4 it will be seen that a tire curing mold 12 has a vent groove 20 which extends across the base of the tire mold cavity from a point which falls at the toe of the bead of a tire of the size and type for which the mold is made. Said groove 20 also extends to the mold dividing line 22 and thence radially inwardly along the sides of said dividing line to the open center of the mold. The vent grooves 20 are similarly placed in both halves of the tire mold, a plurality of such grooves being circumferentially spaced about the base of said mold. It has been found that a spacing of approximately eight inches between said grooves gives satisfactory results. While applicant has not found it to be necessary, it is pointed out that a circumferentially extending groove, similar to grooves 20, may be formed in the base of each half of said mold so as to intersect and join the grooves 20 in each of the mold halves, to further insure the escape of air through said grooves 20.

The present invention reduces to a minimum the separation defects described hereinabove as will now be explained.

The general practice in molding and vulcanizing a pneumatic cord tire is to use a curing bag as a means for pressing the tire against its mold. The curing bag is in the form of an endless tube and is placed in the tire by an operation commonly referred to in the art as a tire bagging operation. The bagged tire is usually laid directly in a vulcanizing mold, which is the case in the embodiment of the invention illustrated. However another method in common use is to mount the bagged tire on curing ring and then lay the assembled tire bag and curing rings in the tire mold. The curing rings are also referred to in the art as bead forming rings or simple forming rings. It is to be understood that if curing rings are used, that grooves, corresponding to grooves 20 in mold 12 are to be cut in the curing rings.

The bag 10 illustrated is provided with an inlet and outlet stem 14 through which a fluid pressure medium flows to and from the bag. In the event that circulating water is used as a pressure medium bag 10 may be provided with an inlet and an outlet stem, as will be understood by those familiar with the art.

In the vulcanizing operation the tire 21 with the bag 10 mounted therein is laid in mold 12 and the mold 12 is closed. Internal pressure is built up in the bag 10 through the medium of air, an inert gas, water, steam, or the like, under pressure flowing through stem 14 into said bag. Before the internal pressure is built up in the bag it fits loosely in the tire permitting considerable air space between the bag and tire. As internal pressure builds up in the bag and the expanding bag presses its outer surface against the inside of the tire, and the tire against the tire mold, most of the air between the bag and the tire will normally escape. However, as explained hereinbefore, some of the air often becomes trapped between the bag and the tire. The present invention vents this trapped air out of the mold from between the bag and the tire and out of the tire mold.

When the outer surface of bag 10 presses against inside surface of a tire the ribs 11 cause a slight bridging of the tire over said ribs forming small vent holes 24 (see Fig. 5) along the extent of said ribs. The ribs 11 cross the base of bag 10; however said base contacts the metal mold and the ribs on the base are substantially flattened after the bag has been in service for a considerable time. This causes the ribs to lose their effectiveness in forming said vent holes between the tire mold and the base of the bag. To insure the movement of air from between the bag and the tire, the grooves 20 are provided. Thus as pressure is built up in the bag 10, the entrapped air follows the vents 24 to the corner of the base of the bag and there enters grooves 20 through which grooves the air flows to the inside parting line of the mold and thence out of the mold to the atmosphere.

While the foregoing specification sets forth the invention in specific terms, it is to be understood that numerous changes in shape, size and material may be resorted to without departing from the spirit of the present invention as claimed hereinafter.

What is claimed is:

1. In combination, a tire curing bag, and a tire mold, said curing bag having vent ribs integral therewith which extend across the base of said bag and radially outwardly on the outer surface of the bag to points at least half of the distance from the base to the crown of the bag, said mold having a plurality of vent grooves circumferentially spaced about the axially extending bead portion of a tire cavity of said mold, said grooves extending from approximately the point the bead toe of a tire cured in said mold comes to the mold's inside parting line and thence radially inwardly along said parting line to the open center of said mold.

2. In combination, a curing bag, and a tire mold, said curing bag having raised ribs on the surface of its sidewall, said mold having vent grooves in the axially extending bead portion of a tire cavity of said mold, said ribs and grooves extending to a common zone of said combination thereby providing vent means for air from between said tire and curing bag.

3. In combination, a vented tire mold and curing bag adapted to effect the escape of air trapped between the curing bag and a pneumatic tire during a tire molding operation, said vents comprising ribs on the outer surface of and integral with said curing bag, said ribs extending downwardly from the sides of said bag to the base portion thereof, and grooves in the axially extending bead portion of the tire cavity of said mold in which said curing operation is performed, said grooves extending from the inside parting line of said mold laterally toward the sides of said mold cavity, whereby said trapped air escapes along the sides of said ribs to that region of the mold provided with said grooves and through said grooves to said parting line of said mold, and thence along the sides of the mold facing said parting line out of the mold.

CORWIN N. SPENCER.

REFERENCES CITED

The following references are of record in the file of this patent:

UNITED STATES PATENTS

| Number | Name | Date |
|---|---|---|
| 1,019,506 | McCool | Mar. 5, 1912 |
| 1,604,450 | Krusemark | Oct. 26, 1926 |
| 1,980,567 | Avery | Nov. 13, 1934 |
| 2,041,534 | Eger | May 19, 1936 |
| 2,376,805 | Peacock | May 22, 1945 |